United States Patent
Robinson

(10) Patent No.: US 10,214,283 B2
(45) Date of Patent: Feb. 26, 2019

(54) AIRCRAFT LANDING GEAR AND METHOD

(71) Applicant: E.B. Robinson Ltd., Kirkfield (CA)

(72) Inventor: Eric Brian Robinson, Kirkfield (CA)

(73) Assignee: E.B. ROBINSON LTD., Kirkfield (CA)

( * ) Notice: Subject to any disclaimer, the term of this patent is extended or adjusted under 35 U.S.C. 154(b) by 0 days.

(21) Appl. No.: 15/021,603

(22) PCT Filed: Mar. 5, 2014

(86) PCT No.: PCT/CA2014/000173
§ 371 (c)(1),
(2) Date: Mar. 11, 2016

(87) PCT Pub. No.: WO2015/035493
PCT Pub. Date: Mar. 19, 2015

(65) Prior Publication Data
US 2016/0221670 A1    Aug. 4, 2016

Related U.S. Application Data

(60) Provisional application No. 61/876,981, filed on Sep. 12, 2013.

(51) Int. Cl.
| | |
|---|---|
| *B64C 25/54* | (2006.01) |
| *B64C 25/66* | (2006.01) |
| *B64C 25/04* | (2006.01) |
| *B64C 25/20* | (2006.01) |
| *B64C 35/00* | (2006.01) |

(52) U.S. Cl.
CPC .............. *B64C 25/66* (2013.01); *B64C 25/04* (2013.01); *B64C 25/20* (2013.01); *B64C 25/54* (2013.01); *B64C 35/008* (2013.01)

(58) Field of Classification Search
CPC ......... B64C 25/04; B64C 25/10; B64C 25/16; B64C 25/54; B64C 25/66; B64C 2025/125; B64C 35/00; B64C 35/001; B64C 35/008
See application file for complete search history.

(56) References Cited

U.S. PATENT DOCUMENTS

| | | | |
|---|---|---|---|
| 1,922,371 | A | 8/1933 | Jones |
| 2,021,876 | A | 11/1935 | Seversky et al. |

(Continued)

FOREIGN PATENT DOCUMENTS

| | | |
|---|---|---|
| FR | 988784 | 8/1951 |
| GB | 125159 | 5/1919 |

(Continued)

OTHER PUBLICATIONS

"AKOYA already on the water", Seaplane International, article dated Nov. 19, 2011.

*Primary Examiner* — Richard G Davis
(74) *Attorney, Agent, or Firm* — Ridout & Maybee LLP

(57) ABSTRACT

An amphibious aircraft has a tricycle landing gear that is movable between a retracted, or up, position and an extended, or down, position. Each member of the landing gear is protected in the forward direction by a hydrodynamic protector, or vane, or shoe, such as may tend to create lift when brought into engagement with water, as during landing. The landing gear protector vanes may be mounted to move with extension and retraction of the landing gear. The landing gear wheels may protrude to extend partially downwardly proud of the sole of the shoe. The landing gear actuator and transmission may operate all gear in concert. The shoes may include sacrificial wear members for ground engagement in the event of an inadvertent gear-up landing on terrain.

18 Claims, 12 Drawing Sheets

(56) References Cited

U.S. PATENT DOCUMENTS

| | | | |
|---|---|---|---|
| 2,342,023 A * | 2/1944 | Vidal | B64C 35/00 114/292 |
| 2,580,452 A | 1/1952 | Miller | |
| 2,844,339 A | 7/1958 | Stroukoff | |
| 2,997,260 A | 8/1961 | Locke, Jr. | |
| 3,154,270 A | 10/1964 | Jensen | |
| 3,156,439 A | 11/1964 | Fleury | |
| 3,347,499 A | 10/1967 | Larkin | |
| 3,526,374 A | 9/1970 | Risken | |
| 3,748,635 A | 7/1973 | Phillips et al. | |
| 3,790,109 A * | 2/1974 | Fischer | B64C 35/00 244/105 |
| 4,027,835 A * | 6/1977 | Sachs | B64C 25/52 114/274 |
| 4,278,219 A | 7/1981 | Finance | |
| 4,484,721 A | 11/1984 | Gue | |
| 4,516,124 A | 5/1985 | Shannon et al. | |
| 4,692,752 A | 9/1987 | Abel | |
| 4,697,762 A | 10/1987 | Arney | |
| 5,277,383 A * | 1/1994 | Tormakhov | B64C 35/00 244/105 |
| 6,059,228 A | 5/2000 | Koizumi et al. | |
| 6,157,891 A | 12/2000 | Lin | |
| 6,264,139 B1 | 7/2001 | Dazet | |
| 6,290,174 B1 | 9/2001 | Gioia | |
| 6,499,420 B1 | 12/2002 | To et al. | |
| 6,848,650 B2 | 2/2005 | Hoisignton et al. | |
| 6,927,702 B2 | 8/2005 | Wiplinger | |
| 7,188,804 B1 | 3/2007 | Boetto | |
| 7,350,751 B2 | 4/2008 | Hawkins | |
| 7,413,140 B2 | 8/2008 | Bietenhader | |
| 7,874,514 B2 | 1/2011 | Said | |
| 8,070,094 B2 | 12/2011 | Collins | |
| 2003/0164424 A1 * | 9/2003 | Smith | B64C 25/12 244/105 |
| 2014/0339359 A1 | 11/2014 | Jeuté | |
| 2015/0321757 A1 * | 11/2015 | DiClemente | B64C 35/001 244/106 |

FOREIGN PATENT DOCUMENTS

| | | |
|---|---|---|
| WO | 2007141425 | 12/2007 |
| WO | 2012101352 | 8/2012 |

* cited by examiner

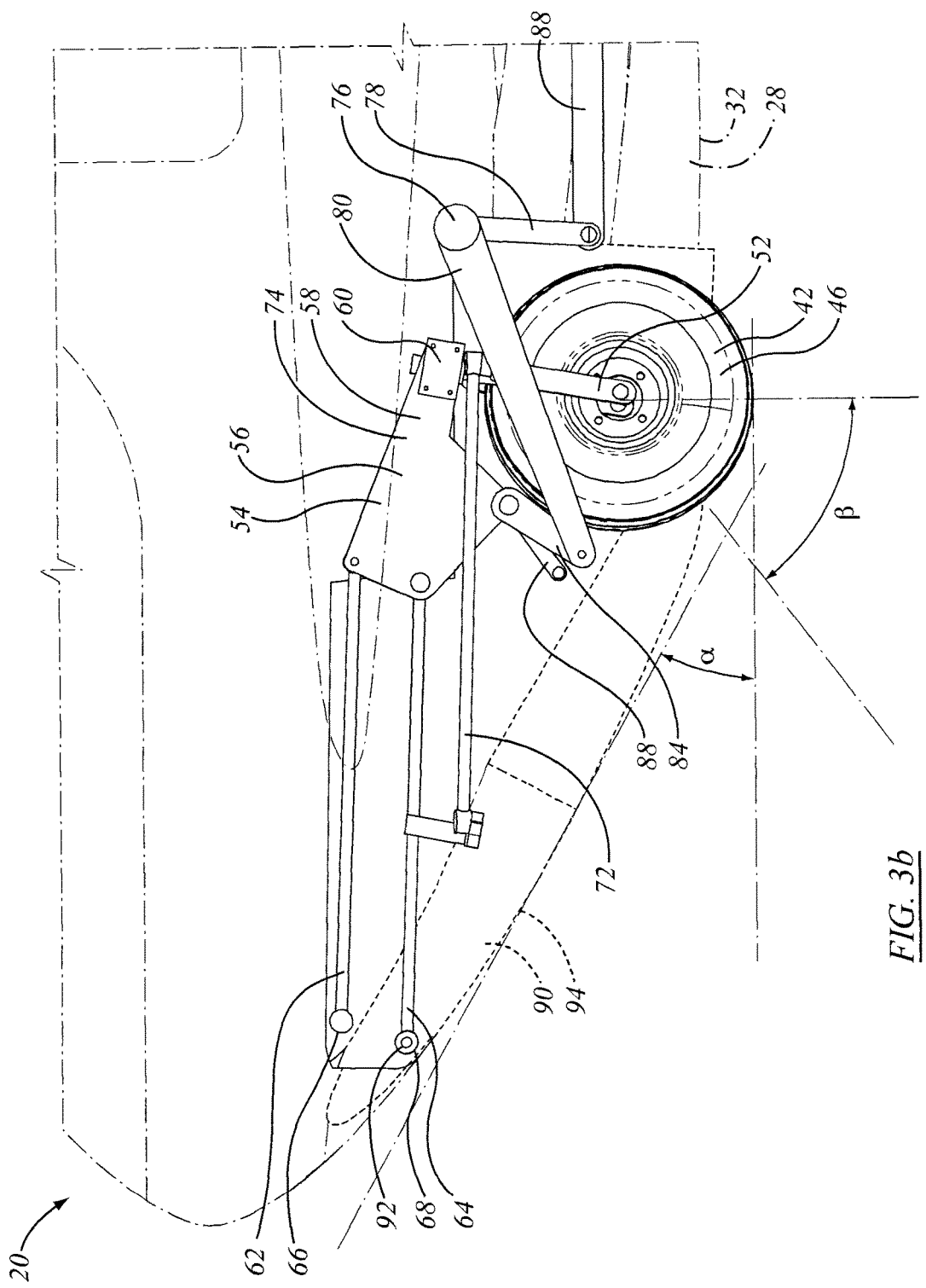

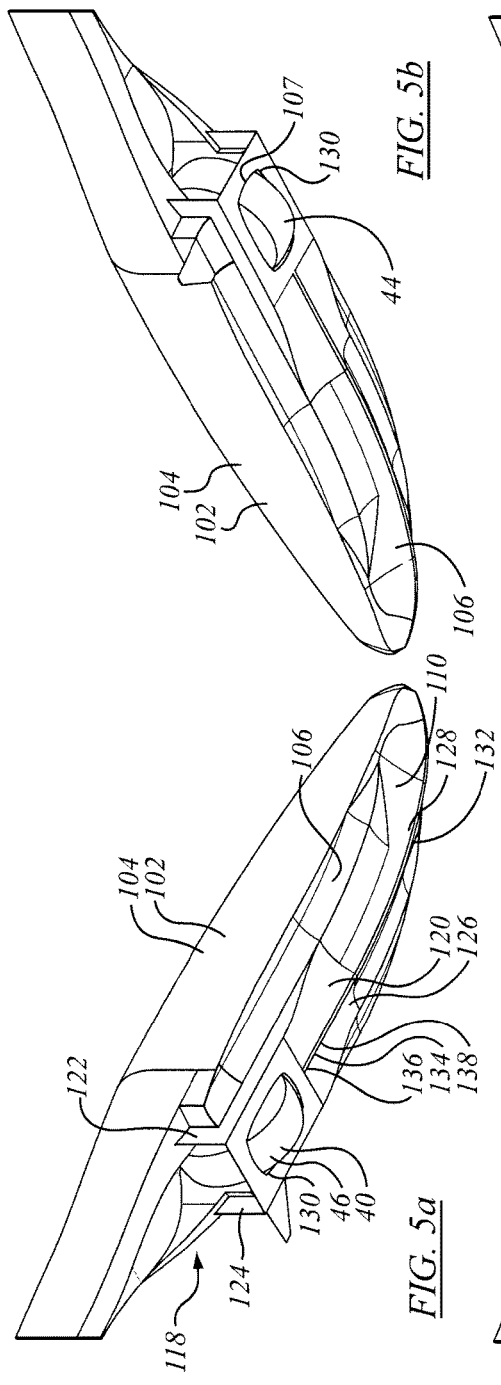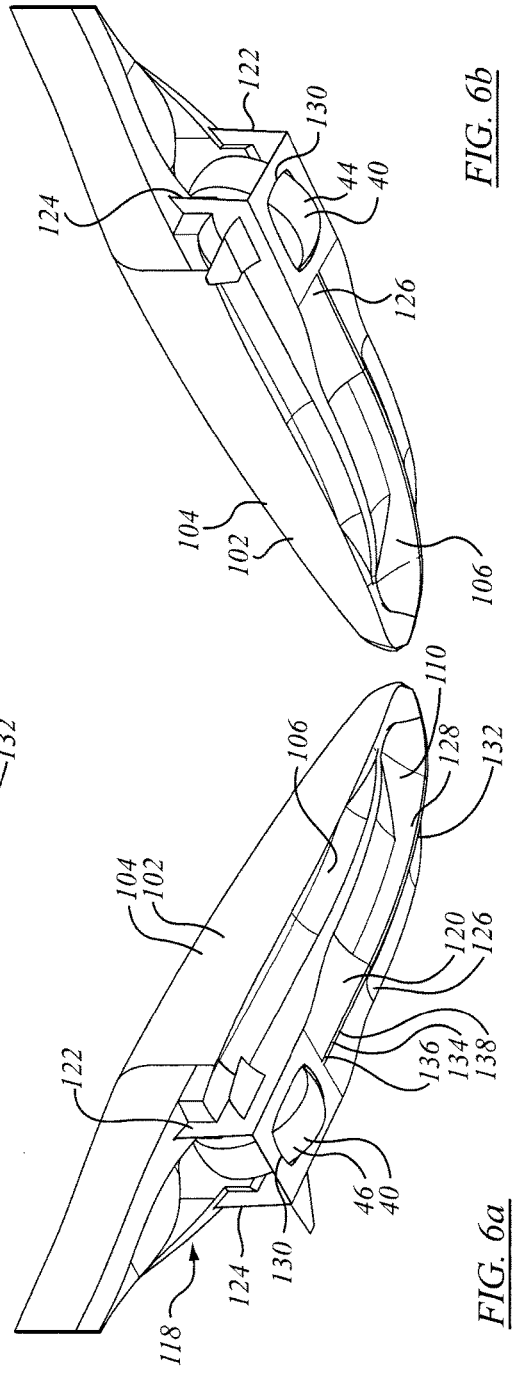

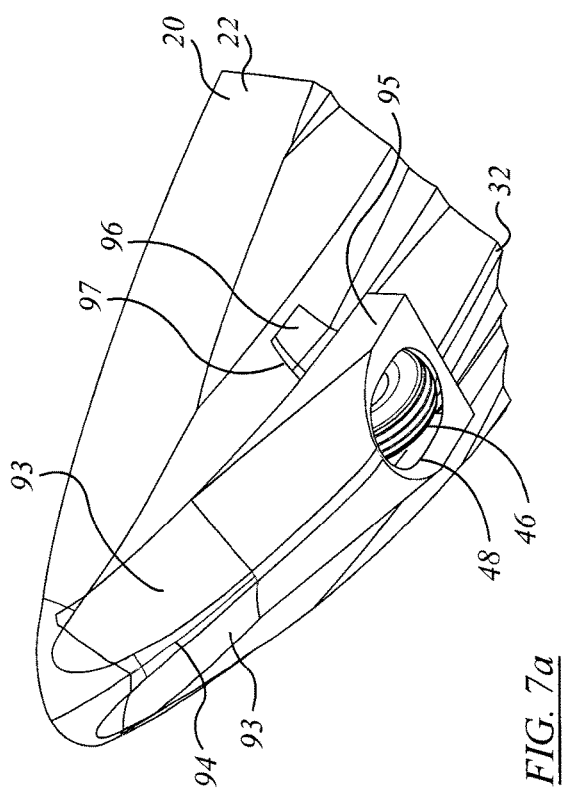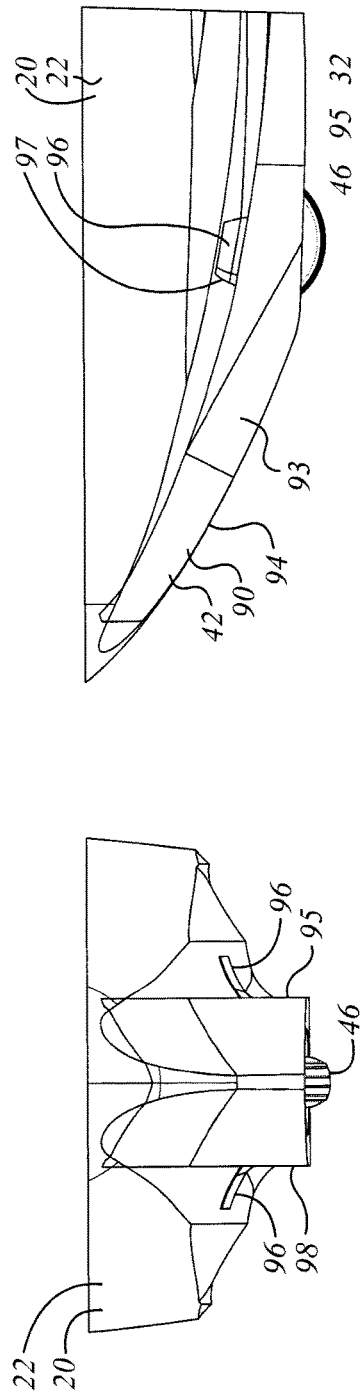

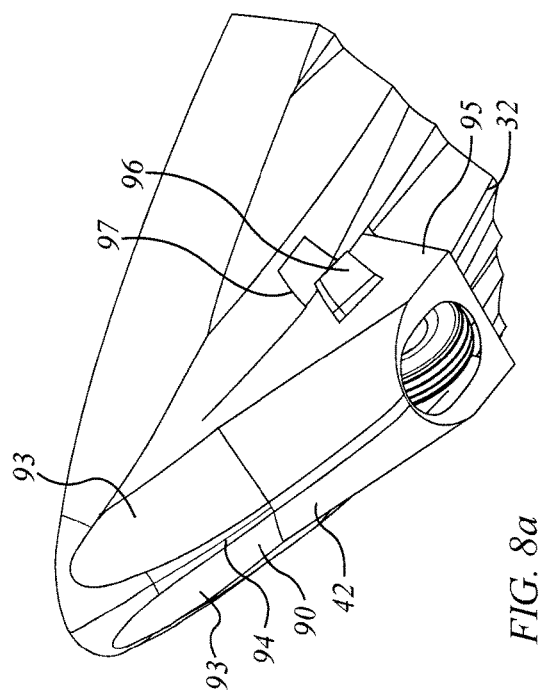
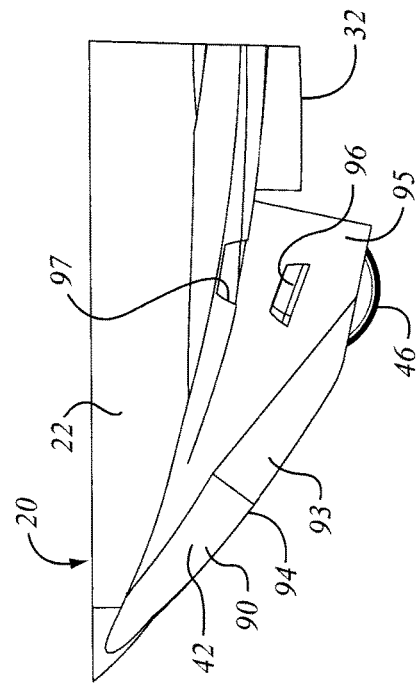
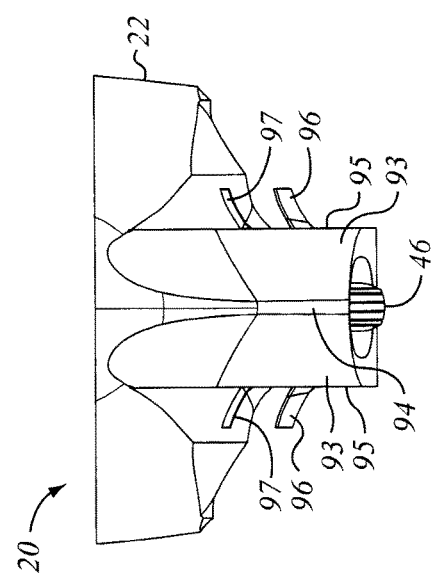
FIG. 8a
FIG. 8b
FIG. 8c

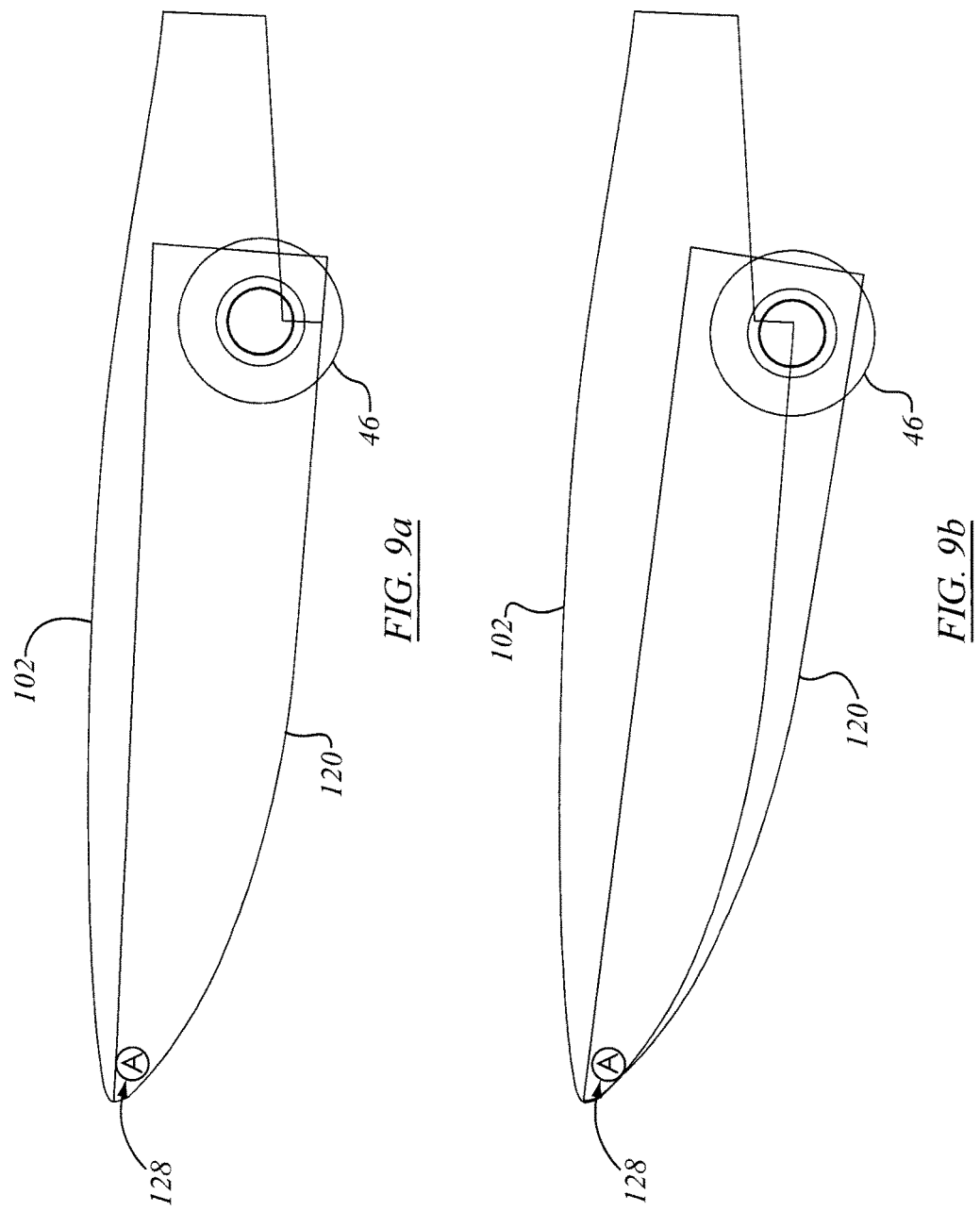

AIRCRAFT LANDING GEAR AND METHOD

FIELD OF THE INVENTION

This invention relates to the field of amphibious aircraft and to landing gear for aircraft.

BACKGROUND

Amphibious aircraft are designed to land either on water or on land. Amphibious aircraft may typically be of two types, namely those with a pair of pontoons; and true flying boats with a water-tight hull. For fixed-wing aircraft, whether using skis or a hull, there will be a forward, or leading, direction, and a rearward or trailing direction.

In either instance it is possible to land, or to attempt to land, a fixed wing amphibious aircraft with the landing gear in an inappropriate configuration. That is, it is possible to make a landing on terrain with the wheeled landing gear retracted; and it is possible to make a landing on water with the wheeled landing gear extended. One cause of accidents in amphibious aircraft is landing in water with the wheels down. A water landing with wheeled gear extended may be catastrophic: as the gear descends into the water, it may tend to function as an oar or paddle that generates a substantial overturning moment on the aircraft, such as may tend to flip the aircraft over on its nose (if the gear plunges into the water symmetrically) or to spin and flip the aircraft, possibly in cartwheel fashion, if one wheel catches the water before the other. In either case the result may be very significant damage or personal injury, or both.

Alternatively, when the aircraft lands on terrain with the wheeled landing gear retracted, the effect may be that of a belly landing, with the possibility of doing significant damage to the aircraft hull (or pontoons). Damage may similarly occur if one or another wheel of the landing gear extends, while one or more other wheels remain retracted.

As amphibious aircraft may, by their nature, fly to destinations that may have non-optimal field conditions, retrieving a damaged aircraft after an unintentional gear-up landing may itself become an adventure.

SUMMARY OF THE INVENTION

In an aspect of the invention there is a landing gear for an amphibious aircraft, the landing gear has a wheel for rolling contact with a landing surface, and a deflector. The deflector defines a water-riding hull extending predominantly forwardly of the wheel. The deflector has an accommodation in which the wheel is mounted. The wheel extends partially downwardly proud of the deflector.

In a feature of that aspect of the invention, the wheel is movable between a retracted position and an extended position, and the water-riding bow or hull is correspondingly movable in co-operation with the wheel. In another feature, the wheel has a foremost exposed portion and at the foremost exposed portion of the wheel a tangent to the wheel, when seen in side view has an angle of less than 45 degrees of arc from horizontal. In still another feature, the deflector has an opening formed therein, and the wheel protrudes through the opening. In a further feature, the opening has a first edge portion running along a first sidewall of the wheel, and an opposed second edge portion running along a second sidewall of the wheel. In still another feature, the deflector has a first side portion, a second side portion, and a keel portion therebetween, the wheel being mounted between the first side portion and the second side portion.

In another feature, the deflector extends at least three wheel diameters forward of the wheel. In still another feature, immediately forward of the wheel the deflector has a centerline slope forwardly and upwardly of the wheel of less than 20 degrees from horizontal. In a further additional feature, immediately forward of the wheel the deflector has a centerline slope forwardly and upwardly of the wheel of less than 30 degrees from horizontal when the wheel is in the extended position. In another feature, in the retracted position, immediately forward of the wheel the deflector has a centerline slope forwardly of the wheel that is tangent to horizontal. In still yet another feature, the deflector has a sacrificial spine. In a further additional feature, the sacrificial spine is exposed and foremost, whereby in a gear-up landing the sacrificial spine is closer to the ground than any other non-wheel structure. In another feature the deflector forms one leg of a four-bar linkage, and the wheel is carried in a seat defining at least one other leg of that four-bar linkage.

In another aspect of the invention there is a landing gear housing, or shell, for a landing gear of an amphibious aircraft. The landing gear housing has a water-riding hull having a leading end and a trailing end. The water-riding hull has a leading portion, a first side portion extending upwardly, and rearwardly to one side of the leading portion, and a second side portion extending upwardly and rearwardly to an opposite side of the leading portion, the first and second side portions being opposed. The leading end of the water-riding hull has a first mounting fitting by which movably to connect the landing gear housing to fixed structure of the amphibious aircraft, the first mounting fitting accommodating motion of the landing gear between a retracted position and an extended position. The trailing end of the water riding hull has a second mounting fitting for a wheel of the landing gear between the first and second side portions. The water riding hull has an accommodation through which the wheel protrudes downwardly in both the retracted position and the extended position.

In a feature of that aspect of the invention, the wheel has an axis of rotation, and the second mounting fitting orients the axis of rotation transversely to the water riding hull. In another feature, the first mounting fitting is a pivotal fitting having an axis of rotation constraining the hull to angular motion, the axis of rotation of the wheel being parallel to the axis of rotation of the pivotal fitting. In another feature, as installed on the amphibious aircraft the landing gear housing defines one bar of a four bar linkage. In a still another feature, the shell has a keel extending along the leading portion thereof. In a further feature the keel is a sacrificial wear member.

In another feature, the shell has an external surface defining an external surface of the amphibious aircraft during both flight and water borne operation. In another feature, the shell has at least one hydrofoil member mounted thereto. In a further feature, the wheel and the landing gear housing move together when the landing gear moves between extended and retracted positions, and the wheel protrudes partially downwardly proud of the landing gear housing in both the extended position and the retracted position.

In still yet another feature, there is a combination of the landing gear housing and a co-operating fixed-position member of the amphibious aircraft wherein the fixed position member and the shell form a co-operating common fairing of the aircraft. In a feature of that combination, the shell has at least one hydrofoil member mounted thereto. In another feature, the shell has at least a first hydrofoil member mounted thereto, and the fixed position member has an accommodation defined therein in which at least a portion of the first hydrofoil when the landing gear is in the retracted position. In a further feature, the first hydrofoil is seated in the accommodation of the fixed position member the hydrofoil is substantially flush therewith. In another feature, the housing has a second hydrofoil member mounted thereto, the first hydrofoil member being axially to one side of the wheel, and the second hydrofoil member being to the opposite side thereof.

In another aspect of the invention there is an amphibious aircraft having a wheeled landing gear for landing on a landing field, the wheeled landing gear being operable between retracted and extended positions. The landing gear is mounted within, and extends partially downwardly proud of, movable landing gear housings that define water-engaging surfaces forwardly and laterally of the landing gear and, said landing gear housings moving together with said landing gear during operation.

In another feature of that aspect of the invention, the landing gear is a tricycle landing gear. In a further feature, the landing gear includes a plurality of wheels, and the landing gear includes a central actuator mounted to a transmission connected to operate all of the plurality of wheels in concert. In another feature one of the landing gear wheels is a steerable nose gear. In an additional feature, the landing gear includes left and right main gear; and a single transmission connected to drive both the left and right gear from a shared actuator.

It may be understood that the various aspects and features may be mixed and matched as may be appropriate. It may also be understood that the foregoing is not intended to be an exhaustive listing of aspects and features of the invention. These and other aspects and features of the invention may be understood with reference to the description which follows, and with the aid of the illustrations of a number of examples.

BRIEF DESCRIPTION OF THE FIGURES

The description is accompanied by a set of illustrative Figures in which:

FIG. 3b is a side, or elevation, view of the steerable nose gear of FIG. 3a in the retracted position;

FIG. 5a shows an isometric, view of a main landing gear housing assembly of the aircraft of FIG. 1 in a retracted position or condition seen from inboard, rearward and below;

FIG. 5b an isometric view of the landing gear housing assembly of FIG. 5a from outboard, rearward and below;

FIG. 5d is an outboard side view of the landing gear housing assembly of FIG. 5a;

FIG. 5e is an outboard side view of the landing gear housing assembly of FIG. 5a;

FIG. 6a shows an isometric, view of a main landing gear housing assembly of the aircraft of FIG. 1 in an extended position or condition seen from inboard, rearward and below;

FIG. 6b an isometric view of the landing gear housing assembly of FIG. 6a from outboard, rearward and below;

FIG. 6d is an outboard side view of the landing gear housing assembly of FIG. 6a;

FIG. 6e is an outboard side view of the landing gear housing assembly of FIG. 6a;

FIG. 7a shows a perspective view of a steerable nose wheel landing gear housing assembly of the aircraft of FIG. 1 in a retracted position as seen from one side, in front, and below;

FIG. 7b is a side view of the steerable nose wheel landing gear housing of FIG. 7a;

FIG. 7c is a front view of the nose wheel landing gear housing of FIG. 7a;

FIG. 8a shows a perspective view of a steerable nose wheel landing gear housing assembly of the aircraft of FIG. 1 in a retracted position as seen from one side, in front, and below;

FIG. 8b is a side view of the steerable nose wheel landing gear housing of FIG. 8a;

FIG. 8c is a front view of the nose wheel landing gear housing of FIG. 8a;

FIG. 9a shows a simplified side view of the main landing gear of FIG. 5a in the retracted position; and FIG. 9b shows the main landing gear of FIG. 6a in the extended position.

DETAILED DESCRIPTION

Figure 1:
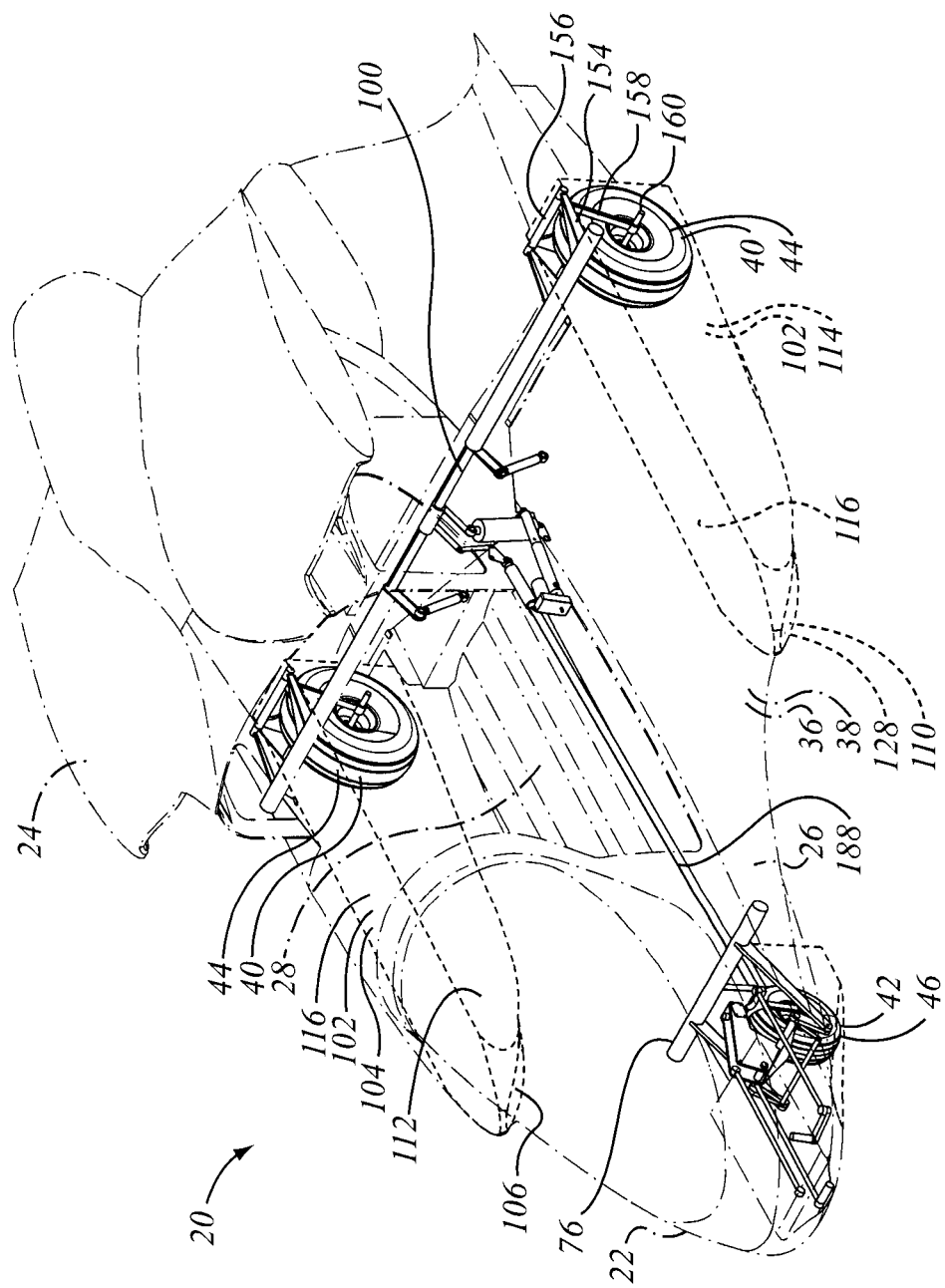
FIG. 1 is an isometric, general arrangement view of a portion of an amphibious aircraft shown in intermittent dashed line, with landing gear nose wheel and main gear housing assemblies shown in dashed lines, and landing gear transmission assembly members shown in solid lines for the purpose of establishing the general spatial arrangement of the various components of the aircraft.
Figure 2A:
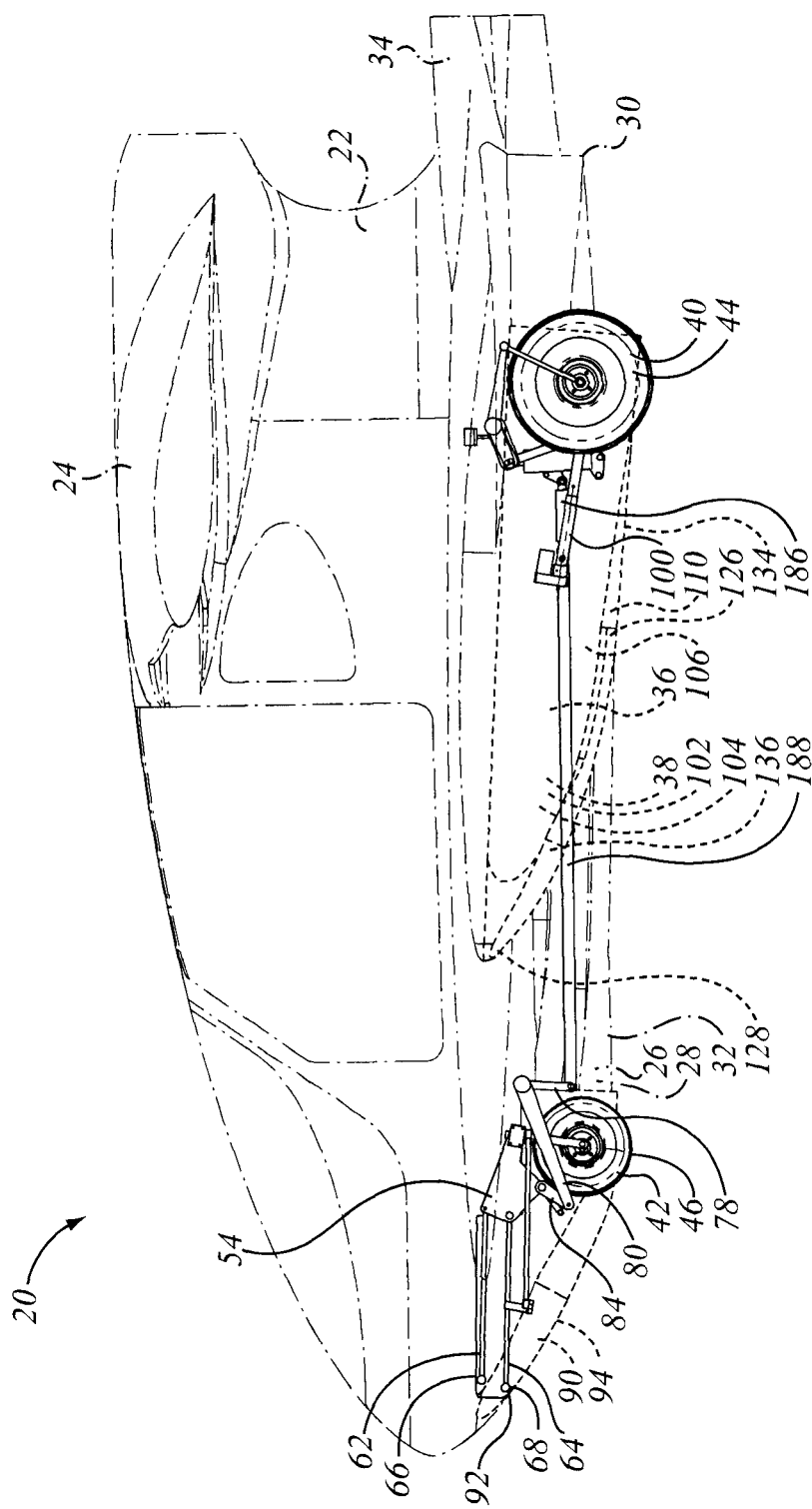
FIG. 2a shows a side, or elevation, view of the amphibious aircraft portion of FIG. 1, with wheeled landing gear in the up or retracted position or condition.
Figure 2B:
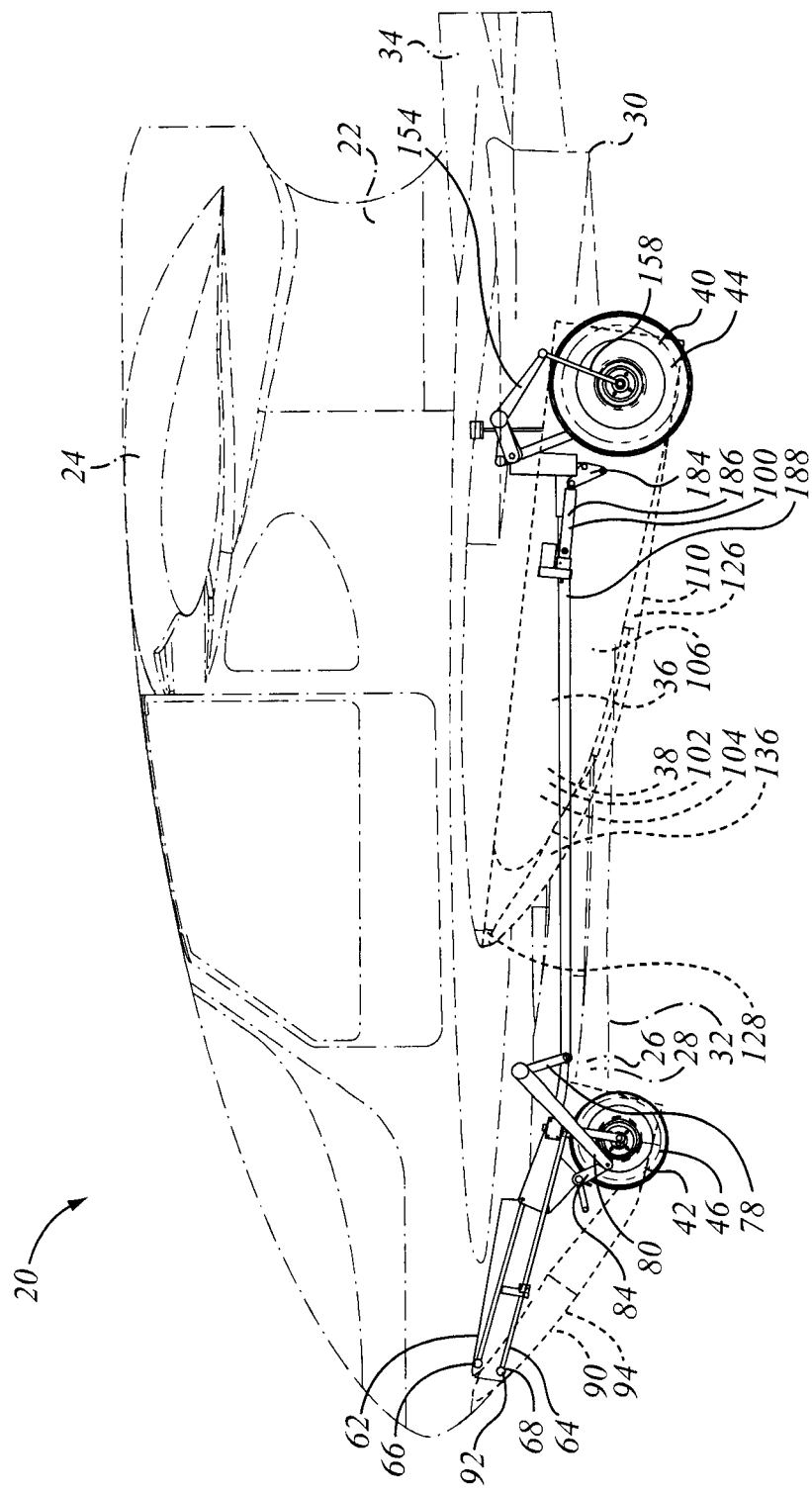
FIG. 2b shows a side, or elevation, view of the amphibious aircraft portion of FIG. 1, with wheeled landing gear in the down or extended position or condition.

The description that follows, and the embodiments described therein, are provided by way of illustration of an example, or examples, of particular embodiments of the principles, aspects or features of the invention. These examples are provided for the purposes of explanation, and not of limitation, of those principles and of the invention. In the description, like parts are marked throughout the specification and the drawings with the same respective reference numerals. The drawings may be taken as being to scale unless noted otherwise.

The terminology used in this specification is thought to be consistent with the customary and ordinary meanings of those terms as they would be understood by a person of ordinary skill in the aircraft industry in North America. The Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record, (for example, earlier publications by persons not employed by the USPTO or any other Patent Office), demonstrating how the terms are used and understood by persons of ordinary skill in the art, or by way of expert evidence of a person or persons of at least 10 years' experience in the aircraft industry in North America or equivalent.

In terms of general orientation and directional nomenclature, for aircraft described herein the longitudinal or lengthwise direction is defined as being coincident with the fore-and-aft direction of flight of the aircraft in straight and level flight. In the case of a fixed wing aircraft, the longitudinal direction is parallel to the rolling direction of the wheeled landing gear and to the keel direction of the hull or pontoons, as may be. The leading direction, or leading edge lies toward the forward direction of travel; the rearward or trailing direction or trailing edge is oriented away from (i.e., backwards relative to) the normal direction of advance of the aircraft. Unless otherwise noted, vertical, or upward and downward, are terms that use the landing terrain (or, alternatively, undisturbed water level), as a datum. In the context of the aircraft as a whole, the terms cross-wise, lateral, spanwise, or laterally outboard, or transverse, or transversely outboard refer to a distance or orientation relative to the longitudinal centerline of the fuselage, or of the landing gear nacelles or sponsons or pontoons, as may be. The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than".

The directions correspond generally to a Cartesian frame of reference in which the x-direction is longitudinal, the y-direction is lateral, and the z-direction is vertical. Pitching motion is angular motion of the aircraft about a horizontal axis perpendicular to the longitudinal direction. Yawing is angular motion about a vertical axis. Roll is angular motion about the longitudinal axis. Given that the aircraft described herein may tend to have a longitudinal axis of symmetry, a description of one half of the aircraft may generally also be intended to describe the other half as well, allowing for differences between right hand and left hand parts. Also, it may be taken as a default that the structure of the aircraft is of aluminum fabrication except as otherwise shown in the illustrations or indicated in the text, although reinforced composite structure may also be employed. Other materials, such as stainless steel, or wood, might be also be used for some components.

In this discussion it may by understood that persons of ordinary skill are familiar with the aircraft construction and maintenance in North America, and may include aircraft maintenance engineers having knowledge of US Department of Transportation, Federal Aviation Administration publication EA-AC 43.13-1A & 2A "Acceptable Methods, Techniques and Practices, Aircraft Inspection and Repair", or any successor publication thereof, as updated at the date of priority filing of this specification. This specification is to be interpreted in a manner consistent with that publication.

FIG. 1 shows a portion of an aircraft, 20. Aircraft 20 is an amphibious aircraft. Although principles, aspects, and features of the invention herein may be applied to rotary wing aircraft as may be appropriate in respect of landing gear apparatus for use in landings with non-trivial forward approach velocity, it may be taken that in the embodiment of FIG. 1 aircraft 20 is a fixed wing aircraft. Aircraft 20 may be a high-wing monoplane, with a fuselage indicated as 22 and the wing structure indicated as 24, the join of wing structure 24 being at the top of fuselage 22. Wing 24 extends laterally outboard to port and starboard of fuselage 22.

Fuselage 22 of aircraft 20 may further include a lower portion 26 which may have formed on the underside thereof a hull 28 for use in water, hull 28 having a leading portion such as may be termed a bow, and a trailing portion, such as may be termed a stern, or step 30. Hull 28 may be curved and, in the main portion thereof, may have a profile centrally downwardly and rearwardly curved to a central, longitudinally extending keel 32. The tail 34 of aircraft 20 may extend rearwardly and generally upwardly of hull 28.

Hull 28 may include lateral bulges 36 such as may tend to extend laterally outboard of the lower portions of fuselage 22. Bulges 36 may also extend somewhat downwardly and may each define a sponson 38. Sponson 38 may include, or may have mounted thereto, a main landing gear housing, or cowling, or apparatus, such as may be designated as main gear housing assembly 40, which, may be either left hand or right hand. Although asymmetric aircraft are known, aircraft 20 may be generally symmetrical about its longitudinal centerline, such that the right hand main gear housing assembly is the mirror image of the left hand one, and the description of one is the same as the other but for their handedness. Hull 28 may also include a nose landing gear housing, or cowling, or apparatus such as may be designated as nose gear housing assembly 42. The nose gear mounted within nose gear assembly 42 may be a steerable nose gear. The left and right hand main gear and the steerable nose gear may define a tricycle undercarriage, and, to the extent that they include respective main wheels 44 and nose wheel 46, provide a tricycle landing gear for use on terrain, be it tarmac, hardpack, a prepared landing field, a beach, or other surface suited to wheeled motion. The landing gear may be extended, such as for a wheeled landing; or may be retracted, such as for a water-borne landing.

Figure 3A:
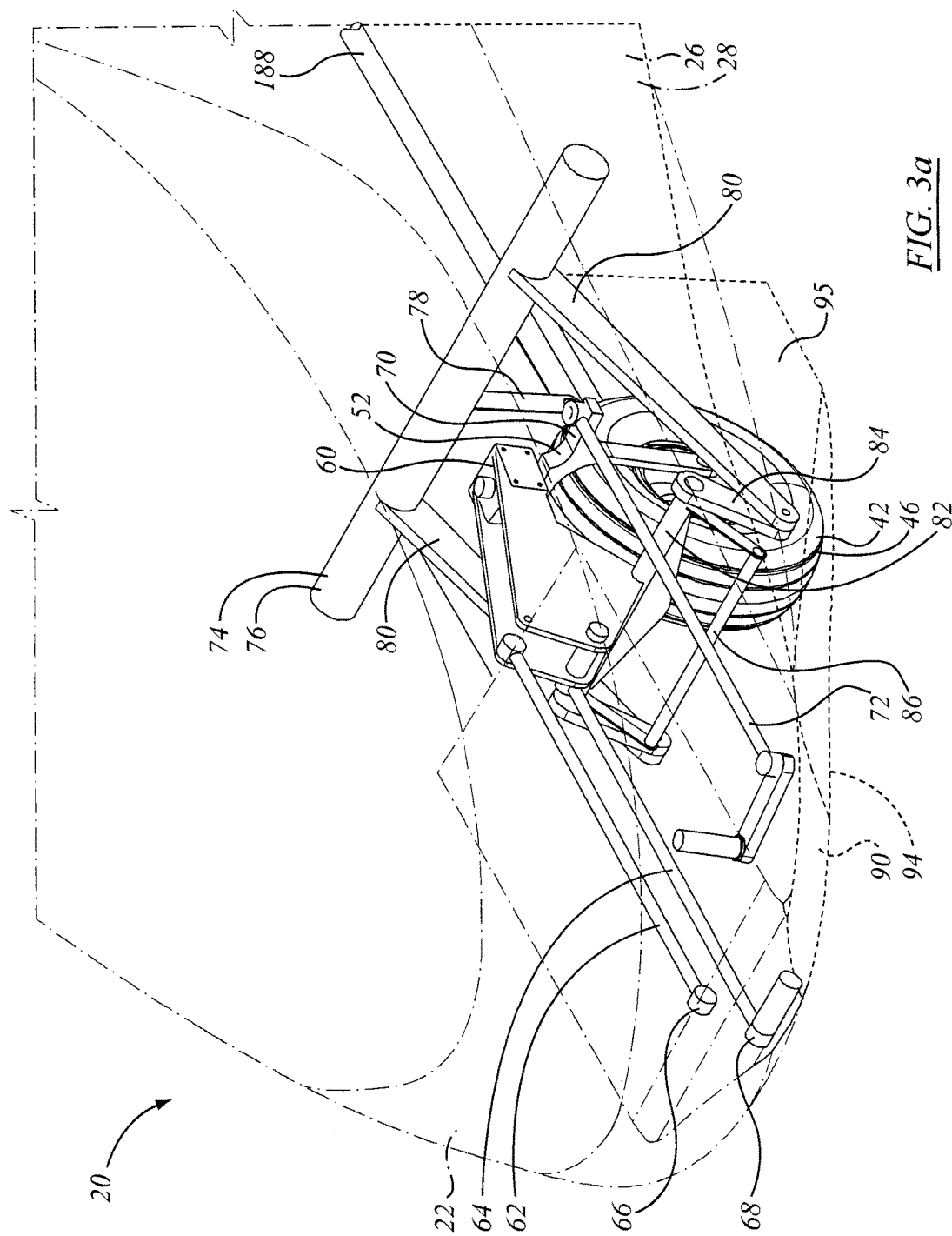
FIG. 3a is an isometric, general arrangement view of an enlarged detail of a steerable nose gear of the aircraft of FIG. 1.

Referring to FIG. 3a, nose wheel 46 of assembly 42 is mounted in a clevis or yoke 52 having a central, vertically oriented pivot shaft that is pivotably mounted in a mating steering mount assembly 54. Steering mount assembly 54 includes a pair of laterally spaced apart left and right side frames 56, each of which may be substantially planar, the two being mutually parallel. When viewed in profile, side frames 56 have a generally four-sided shape, interrupted by a rearwardly extending arm 58. Side frames 56 are held in spaced relationship the rearwardly mounted box-structure of the steering head shaft mount 60, and by a forward lateral shear web 60 mounted on, or across, the downwardly and rearwardly angled lower edge of side frames 56.

Upper and lower linkages 62 and 64 are pivotally mounted at the upper and lower forward corners of sideframes 56. Linkages 62 and 64 are of the same length. Each has a first end mounted to the aircraft structure, such as in the nose of the fuselage as at 66 and 68 respectively, that first mounting being a pivotal mounting having a single degree of freedom, namely pivotal motion about the y-axis. The second end also has pivotal mountings having axes of rotation in the y-direction. Since the respective first ends and second ends are spaced the same distance apart, the quadrilateral of the four bar linkage so formed (i.e., two linkages, the main aircraft fuselage structure, and sideframes 56) defines a parallelogram such that while sideframes 56 follow the arc of the second ends (i.e., the ends distant from fixed structure) of linkages 62 and 64, the angular orientation of sideframes 56 about the y-axis is constant. Thus the orientation of the z-axis of the steering stub shaft may tend to remain vertical. Steering yoke 52 has a laterally extending tiller or arm 70 and steering linkage 72 by which nose wheel 46 may be turned left and right, as appropriate.

The nose gear assembly, and therefore nose gear housing assembly 42 which moves with the nose gear, is driven up and down by a nose gear actuator assembly, indicated generally as 74. Actuator assembly 74 includes a main shaft, or torque tube 76 that extends laterally across the fuselage (i.e., in the y-direction) between pivotal mountings mounted to the fuselage structure, such as bushings. Torque tube 76 is able to pivot in a single degree of freedom, namely angular rotation about the y-axis. An input arm 78 is mounted generally centrally to toque tube 76, and may be pushed or pulled to create a moment couple driving torque tube 76 clockwise or counter-clockwise. Left and right hand output arms 80 extend forwardly and downwardly of torque tube 76 to straddle nosewheel 46. A lateral cross-member 82 is rigidly mounted to, and across, sideframes 56, and extends laterally from either side of the lower aft-ward corner thereof. Lateral cross-member 82 may be a shaft that is free to rotate about the y-axis. Drag links 84 extend between the respective ends of lateral cross-member 82 and the distal ends of output arms 80, such that when torque tube 76 turns, the ends of arms 80 move clockwise or counter-clockwise, drawing (or pushing) on drag links 84, thereby forcing shaft 86, (and hence sideframes 56 and nose wheel 46), to follow the arc of motion of links 62, 64. Assembly 42 may also include a return spring, or counter-weight spring, 88, such as may tend to bias nose gear housing assembly 42 to the retracted position. When not being moved, the nose gear assembly, or actuator assembly 76, as may be, has locks that retain the nose gear in either the up position or the down position, with associated up-lock and down-lock indicators.

Nose gear housing assembly 42 is, not surprisingly, mounted at or near the nose of the aircraft. Nose gear housing assembly 42 may also have, or be, a nose gear shield, or deflector assembly, or shoe, which may be identified generally as nose gear deflector 90. Deflector 90 is pivotally mounted to fuselage 22 at a pivot fitting location well forwardly of nose wheel 46, as indicated at location 92, and may be co-axially mounted with either first end 66 or first end 68 of linkages 62 or 64, such that deflector 90 may follow the same arc. The axis (or respective axes) of rotation of the pivot fitting connection at location 92 (be it at 62 or 64) runs horizontally cross-wise to the aircraft longitudinal centerline. Thus any point of nose wheel landing gear housing assembly 42 moves in an arc in a vertical plane parallel to the longitudinal centerline (and the presumed direction of forward motion) of aircraft 20 more generally. Deflector 90 may have the form of a hull or prow, or stem, or planing surface with a central ridge or stem, such as may tend to displace or ride over, water in the manner of a ski or planing hull. Although deflector 90 may have an aerodynamic or hydrodynamic form, deflector 90 is not a cosmetic cowling. It has the structural strength to support the aircraft when landing on water; it is also intended to have structural strength to support the aircraft in an unintentional gear-up landing on terrain, should the range of deflection on impact exceed the limits of deflection of nose wheel 46 alone while nose wheel 46 is in the retracted position. To that end, the longitudinal centerline of deflector 90 may have a central spine, or rib, or keel, or protector, or wear member, wear strip, such as may be in the nature of a sacrificial member or sacrificial keel 94 extending along the most exposed centerline portion thereof. In the event of a hard landing, or in the event of striking a floating object, sacrificial keel 94 may tend to contact the terrain or floating object first, and skid along or over it. To either side of sacrificial keel 94 extending obliquely rearwardly, upwardly and laterally inboard or outboard as the case may be, are first and second side portions identified as 93. Which terminate rearwardly in substantially vertical sidewalls 95 that seat within the side edges of the well in fuselage 22 that accommodates nose wheel housing assembly 42 more generally. To the extent that sacrificial keel 94 is thereby damaged, it is intended that it may be replaced as necessary or suitable. Deflector 90 may be attached to, or suspended from, spring 88.

As can be seen, deflector 90 extends forwardly of wheel 46 on a gentle curve that is more forwardly than upwardly, and that, at the point of intersection of the projected curve of the hull and the tangent of the profile of the tire is an oblique angle of perhaps something greater than 120 degrees. As can be seen, nose wheel 46 is mounted within nose gear housing assembly 42, such that the bulk of wheel 46 is between the inboard and outboard sides of the housing, and the lowermost cusp or portion of wheel 46 extending through the accommodation, namely aperture 48, downwardly proud of the deflector centerline. In the case of a steerable nose-wheel, aperture 48 is of a shape (such as circular in plan view) to permit wheel 46 to turn. Nose gear housing assembly 42 has a main portion that extends forwardly of wheel 46, but also side portions that extends alongside, and outwardly and upwardly, of the axle, and most of the sidewall of the body of wheel 46. Thus wheel 46 is mounted within nose gear housing assembly 42, generally toward the rearward or trailing end thereof distant from the pivot mounting at the forward or leading end of housing 42.

In the example, the extent to which wheel 46 extends downwardly proud may by 4-6 inches. Expressed differently, the point of intersection of the curves may be somewhere between the 7 o'clock and 8 o'clock positions. Expressed differently again, the wheel may protrude proud of the surface a distance S, where $S=D(1-\cos(\text{Theta}))$, D being the outside diameter of wheel 46 and theta being the angle (measured from the six o'clock position of wheel 46) at which the wheel profile intersects the deflector profile on the centerline. Theta may be in the range of perhaps 15 to 65 degrees, and, in one embodiment, may be in the range of 30-50 degrees. The general tangent slope at mid arc of deflector 90, indicated as alpha, may be of the order of 15-40 degrees from the horizontal. In the embodiment shown, it may be 20-35 degrees, with the local tangent angle being closer to 15 or 20 degrees immediately forwardly of nose wheel 46, and closer to 35 or 40 degrees in the neighbourhood of forward pivot point 68. Expressed differently yet again, deflector 90 has a length $L_{90}$ forwardly of the axle of nose gear wheel 46 that may be in the range of about 3-8 times the diameter of nose gear wheel 46.

In general, deflector 90 provides a smooth lead-in-surface extending forwardly of wheel 46 for engaging, and riding upon, water-like a ski, or hull or slipper or shoe. In some embodiments, the surface of deflector 90 may also extend aftward of wheel 46 in a trailing edge tail. Wheel 46 extends partially downwardly proud of the profile of deflector 90. The extent to which it stands downwardly proud may correspond to the expected deflection of the tire of wheel 46 during a normal landing, plus an allowance of extra travel, perhaps 50% of nominal normal landing load travel. In the event that aircraft 20 should land on water with the nose gear extended, nose wheel 46 can only partially immerse itself before the aftmost portion of deflector 90 also engages the water. At speeds of interest, the clock-wise counter-acting lift arising from deflector 90 planing on the water may tend to counter-act the counter-clockwise pitching moment generated by hydrodynamic drag on the exposed protruding portion of wheel 46.

As illustrated in FIGS. 7a and 8a, the forward facing surface deflector 90 of housing assembly 42 defines a portion of the aerodynamic form, or fairing, of the nose of the aircraft in both the retracted and the extended conditions. As seen in FIG. 7b, in the retracted position deflector 90 seats flush with the aftwardly extending keel of fuselage 22.

In some embodiments, aircraft 20 may have hydrofoil members 96 such as may be mounted to the upstanding laterally spaced apart sidewalls 95 of housing assembly 42. In the retracted position, hydrofoils 96 seat in accommodations 97 defined in fuselage 22, such that hydrofoils 96 are substantially flush with the adjacent structure and form a relatively smooth, continuous streamline or continuous fairing surface as shown in FIGS. 7a, 7b and 7c. In the extended position of the nose gear as shown in corresponding FIGS. 8a, 8b and 8c, hydrofoil members 96 are exposed to passing water flow, and, upon contact with the water, may tend to exert a lifting force that is transmitted back through the structure to lift the nose of aircraft 20 (i.e., to give aircraft 20 a clockwise turning moment in the side view of FIG. 7b to counter-act the counter-clockwise over-turning moment such as may be generated by wheel 46 (or wheels 44 further aft, as may be). In the embodiment shown, hydrofoil members 96 are mounted abreast of wheel 46, at a level comparable to, and in some embodiments slightly above, the axle centerline of wheel 46.

Figure 4A:
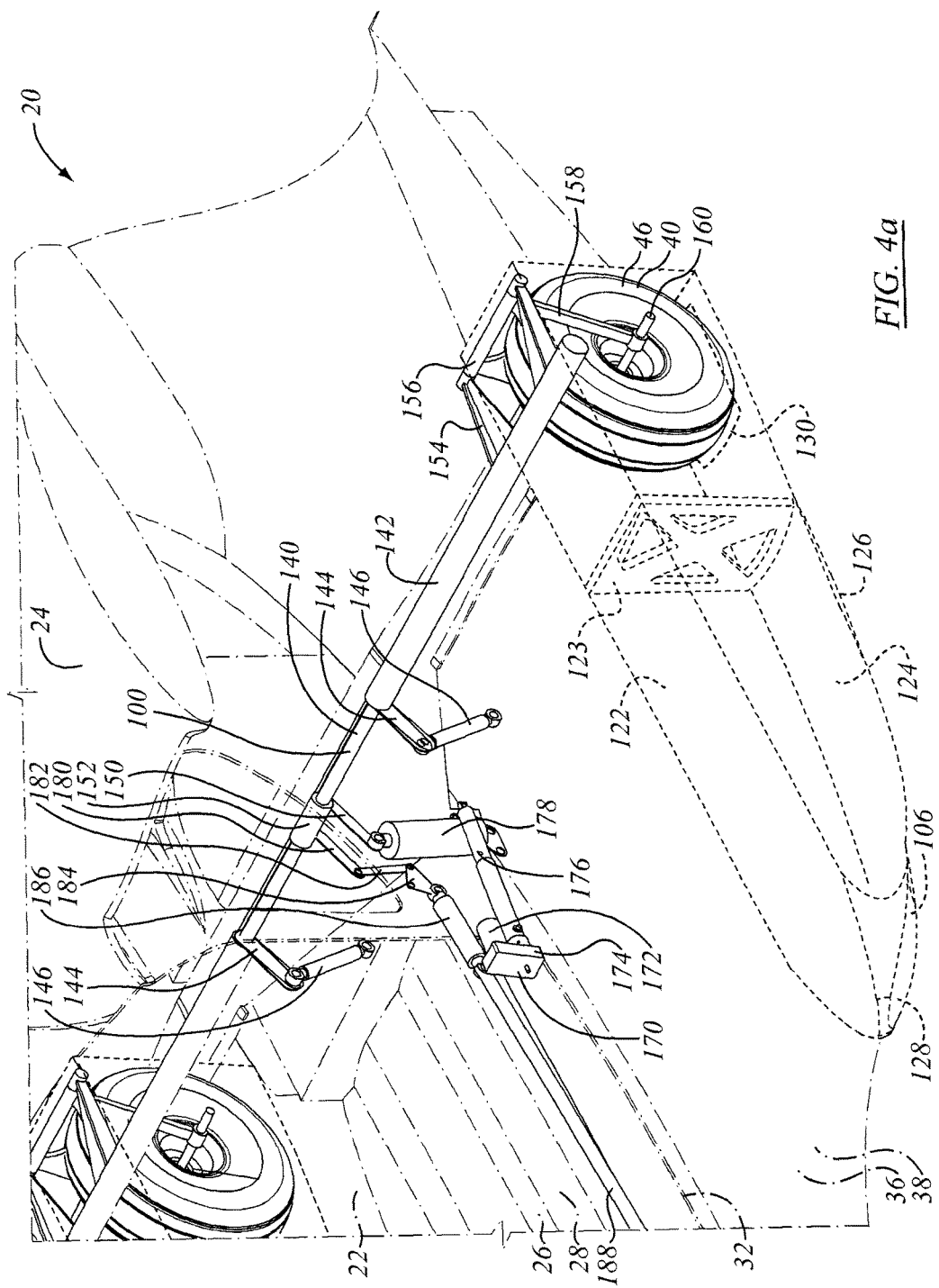
FIG. 4a is an isometric, general arrangement view of an enlarged detail of the left main gear of the aircraft of FIG. 1.
Figure 4B:
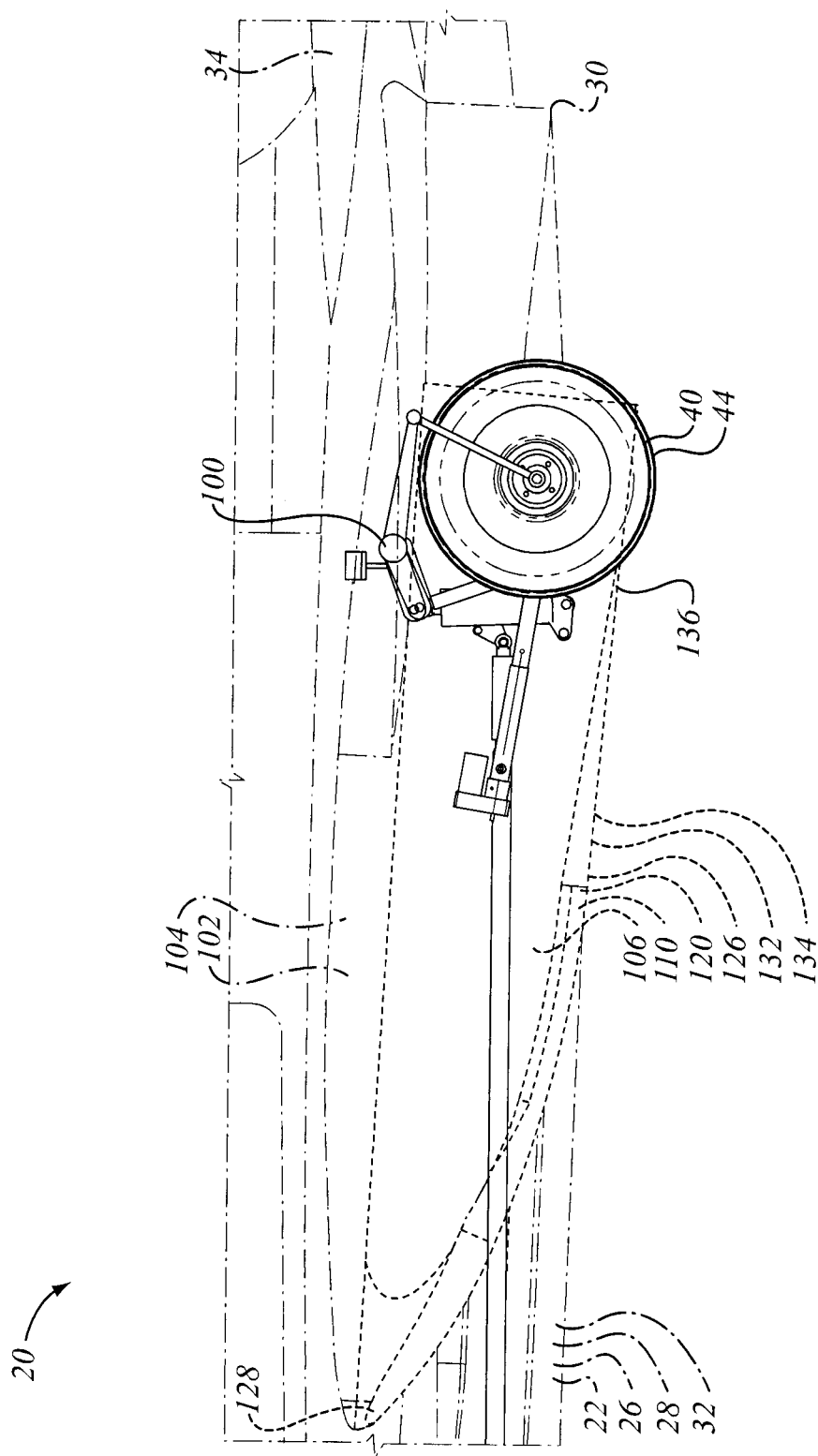
FIG. 4b is a side, or elevation, view of the left main gear of FIG. 4a in the retracted position.

FIG. 4a shows the landing gear transmission, identified generally as 100. Many structural features have been omitted from this illustration for the purpose of making the landing gear components more easily visible. As with nose gear housing assembly 42, main gear housing assembly 40 (be it port or starboard) has main gear wheel 44 installed in a landing gear housing generally indicated as 102. Housing 102 has a stationary upper, or main, portion 104, which is rigidly mounted to sponson 38; and a co-operating, movable, or lower portion 106, which may include a pivotally mounted main gear vane, or protector, deflector, or deflector assembly 110. The pivot mounting may be at the first, or leading, end of housing 102. Inasmuch as housing 102 may ultimately transmit the reactive force from the main gear to carry the aircraft structural load, housing 102 is structurally connected to a laterally extending spar or beam structure, indicated as 108. Structure 108 may include an I-beam and a deep central frame assembly 98 as shown in FIG. 4a. The ends of beam-and-frame structure 98 are cantilevers, which have a measure of vertical flex, and the main gear loads are carried at the ends of the cantilevers. Main portion 104 may have an inboard wall 112, an outboard wall 114, and an upper wall or covering or cowling 116 all of which may be rigidly interconnected, and which may have a faired aerodynamic shape. Housing 102 is mounted to the outboard margin of sponson 38, be it port or starboard. Sponson 38 is water tight, and the bottom wall of sponson 38 forms a portion of hull 28. Housing 102 has a downwardly opening accommodation 118. Accommodation 118 is generally rectangular, being much longer in the x-direction than wide in the transverse y-direction, such as may be co-operatively shaped matingly to work with the generally box-shaped main gear slipper, or shoe, 120 of lower portion 106.

As seen in FIGS. 5a to 5e, and in FIGS. 6a to 6e, shoe 120 may have an inboard longitudinal wall 122, an outboard longitudinal wall 124, a bottom deflector plate 126, joined together to form a generally U-shaped structure, with side walls 124, 126 being generally vertical, parallel and spaced apart. Main gear wheel 44 is mounted between the inboard and outboard portions or walls of deflector shoe 120. There may be lateral shear webs or shear frame braces 123 extending laterally therebetween forward of main gear wheel 44 to maintain walls 122 and 124 in spaced parallel relationship from each other. The forward end of shoe 120 is enclosed, as where bottom deflector plate 126 is curved forwardly and upwardly to define the forward tip of the ski or slipper, or vane, however it may be called. A pivot mount is located at the foremost tip of shoe 120, being indicated as 128, and is mounted in structural load spreading bushing assemblies in main portion 104. The axis of rotation of the pivot mounting may be horizontal and cross-wise to the vertical plane of symmetry of the aircraft centerline. Bottom deflector plate 106 may be backed by reinforcements in the nature of longitudinal stringers and transverse frames suitable for maintaining its structural integrity in expected operation.

Figure 5D:
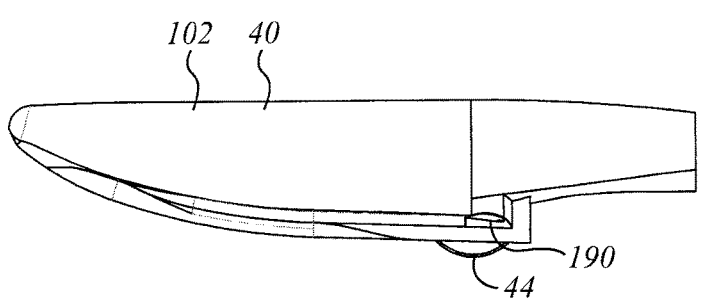
Figure 5C:
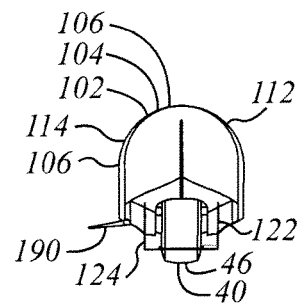
FIG. 5c shows a trailing end view of the landing gear housing assembly of FIG. 5a looking forward.
Figure 5E:
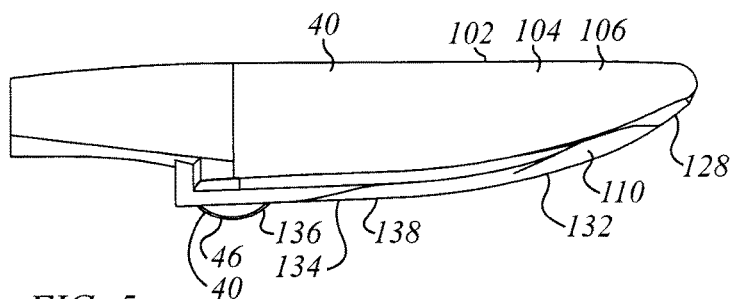
Figure 6D:
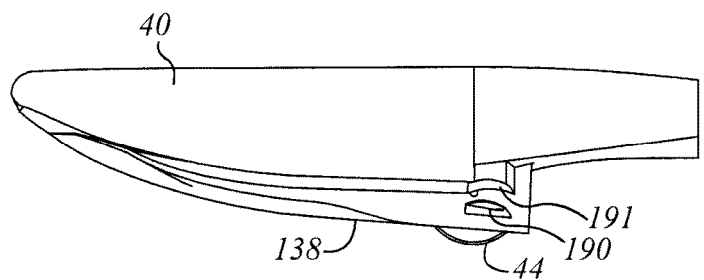
Figure 6C:
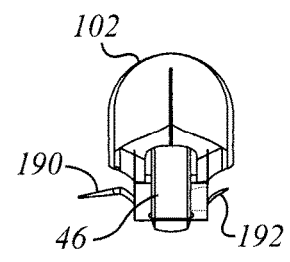
FIG. 6c shows a trailing end view of the landing gear housing assembly of FIG. 6a looking forward.
Figure 6E:
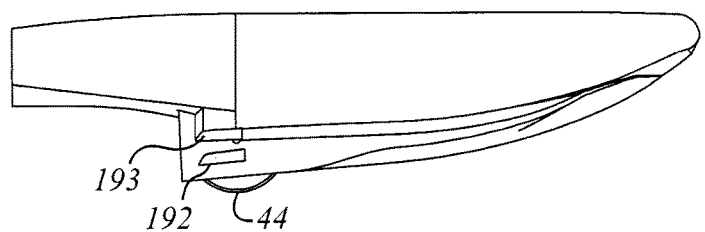

Bottom deflector plate 106 has a rearwardly located relief 107 near its trailing end to accommodate protrusion of main gear wheel 44. As shown in FIGS. 5a and 5b, 6a and 6b, relief 107 may have the form of an accommodation 130 which may be a rectangular opening, or it may be a generally oval or rounded elongate opening corresponding to the shape of the tire of wheel 44. The opening is such as to have a first edge portion forwardly of wheel 44, and side portions running along the sidewalls of wheel 44. Main gear wheel 44 seats, or is mounted within assembly 40 between the sidewalls thereof, with a portion, or cusp of wheel 44 protruding through relief 107. Since wheel 44 moves and housing assembly 40 move together, wheel 44 protrudes from plate 106 in both the extended and retracted positions of the landing gear. Bottom deflector plate 106 may also have, or be formed to have, a lengthwise extending keel, 132, which may have a replaceable sacrificial wear member or skid 134. Skid 134 may be made of a consumable material such as stainless steel. As seen in FIGS. 5d and 5e keel 132 is gently upwardly angled, being nearly horizontal at the point at which the foremost portion of wheel 44 crosses the profile of keel 132, and is formed forwardly curvedly with an increasing angle of slope toward the nose. As may be understood, in a normal landing, shoe 120 may tend to plane along the water. In an inadvertent gear-up landing on terrain, wheel 44 may contact the terrain first, and only to the extent that the landing is heavy will shoe 120, and, in particular skid 134, ride along the terrain. In an inadvertent gear-down landing on water, even as fully deployed in FIG. 5e, the clockwise overturning moment due to drag on the exposed portion of wheel 44 may tend to be counteracted by the lift generated in planing as soon as leading portion 136 of shoe 120 immediately forward of wheel 44 begins to bear on the water surface. The protective presence of the slipper or shoe 120 forward of wheel 44 may tend to limit or counteract the overturning drag that can be developed by water drag on wheel 44. Further, considering FIG. 3a, to the extent the nose gear deflector 90 may also engage the water, the counter-acting lifting force of deflector 90 planing on the water has a very long moment arm relative to wheel 44.

The primary element of transmission 100 of FIG. 4a is a laterally extending shaft 140 that extends outboard to both port and starboard. At its most outboard extremity shaft 140 is connected to a co-axial outer tube 142, which may be termed a torque tube. At its most inboard end, torque tube 142 terminates at a lever arm 144 that has a hollow center to permit the passage of shaft 140. Arm 144 extends to the top end of a damper or spring-damper combination, identified as shock absorber 146. The other end of shock absorber 146 is mounted to a bushing, which is itself mounted to a load spreading bracket (not illustrated) within the frame of the fuselage or sponson. An input arm 150 is mounted to a sleeve 152 on shaft 140. As may be understood, moving input arm 150 clockwise and holding arm 144 stationary will cause shafts 140 and 142 to wind up as two torque springs in series.

As shown in FIG. 4a, the outboard end of torque tube 142 is carried in a bearing mounted to upper portion 104 of housing 102. There may also be a central bearing at sleeve 152, and another bearing mounted about torque tube 142 immediately outboard of arm 144. At the outboard end of torque tube 142 is a first pair of matched rearwardly extending arms defining a first wishbone 154. At the tips of the legs of first wishbone 154 is a cross-shaft 156 that ties the two tips together. A second wishbone 158 with hollow shaft mounted co-axially with cross-shaft 156, and two extending legs (i.e., a fork or clevis, or wishbone) reach from shaft 156 to axle 160 of wheel 44. The ends of axle 160 are mounted in seats or bushings that are themselves mounted to inboard wall 122 and outboard wall 124 respectively. The assembly so described defines a four bar linkage. That is, the first bar of the linkage is the fixed structure of the aircraft. The second bar of the linkage, effectively pivotally mounted to the fixed structure, is the first wishbone, 154. The third bar of the linkage is the second wishbone 158, and the fourth bar of the linkage is the deflector or slipper, or shoe, 120 which is pivotally mounted to the fixed structure of the first bar at pivot 128. That is, relative to the fixed structure of the aircraft, shoe 120 defines the fixed radius arm constraining the arc of motion of wheel 46 and main gear bottom deflector plate 126. Input to shaft 140 uniquely determines the position of first wishbone 154, and therefore also the position of second wishbone 158 which functions as a drag link or slave link in this mechanism. Thus wheel 44 is limited to translation in a single degree of freedom along the circumferential arc described by the axle bushings mounted to deflector 120. Given the relative length of the arm defined by deflector 120, and given the close to horizontal orientation of the arm, that motion is substantially, predominantly, upward-and-downward. Wheel 44 is movable between retracted and extended positions, as shown. There is an up-lock, and there is a down-lock, not shown. On landing, shaft 140 and torque tube 142 provide a somewhat resilient response, that response being damped by shock absorber 146.

Transmission 100 is driven between retracted and extended positions by actuator assembly 170 mounted within hull 28. Actuator assembly 170 includes a motor (and motor control) 172, a gear reducer 174 driven by motor 172; a worm drive 176 connected to the output of gear reducer 174; and a reciprocally movable actuator 178 driven by worm drive 176. As will be understood, driving motor 172 in a first direction will cause the jack of actuator 178 to extend, driving arm 144 clockwise with the effect of extending the main gear; driving motor 172 in the opposite direction will cause the jack of actuator 178 to retract, driving arm 44 counter-clockwise, with the effect of retracting the main gear. Other arrangements of drives could be used. In each case, deflector 120 moves with the main gear, or, expressed differently, the deflector and the wheeled landing gear move together.

Sleeve 152 also carries an output interface, or output arm 180, which is connected to a drag link 182, which drives a bell-crank 184. The output of bell crank 184 is connected to a shock absorber 186, which in turn carries the aftmost end of a connecting rod 188. Connecting rod 188 has a foremost end mounted to input arm 78 which drives torque tube 76 of nose gear assembly 42. Shock absorber 186 may tend to provide a measure of damping decoupling of the nose gear from the main gear. Thus motion of actuator 178 drives all three wheels of the tricycle assembly in a co-ordinated manner up and down. In each case, the action of the respective wheel carries the associated deflector up and down as well.

Referring again to the main gear, deflector 120 protects the forward side of main wheel 44. As noted, deflector 120 has a long and thin shape, deployed leading main wheel 44. The moving protective deflector, or vane, or shoe, may extend 2-8 wheel diameters forward of the main gear axle centerline, and, as above, it may be positioned and angled to leave exposed only a portion of main wheel 44, as seen from looking aft along the wheel centerline.

Expressed differently, the point of intersection of the curves of the profile of deflector plate 126 and wheel 44 may be somewhere between the 7 o'clock and 8 o'clock positions. Expressed differently again, the wheel may protrude proud of the surface a distance S, where S=D(1−Cos (Theta)), D being the outside diameter of wheel 44 and theta being the angle (measured from the six o'clock position of wheel 44) at which the wheel profile intersects the deflector profile on the centerline. Theta may be in the range of perhaps 15 to 65 degrees, and, in one embodiment, may be in the range of 30-50 degrees. The general tangent slope at mid arc of deflector plate 126 may be of the order of 15-40 degrees from the horizontal. In the embodiment shown, it may be 20-35 degrees, with the local tangent angle being closer to 15 or 20 degrees immediately forwardly of main gear wheel 44, and closer to 35 or 40 degrees in the neighbourhood of forward pivot point 68. Expressed differently yet again, deflector plate 126 has a length $L_{126}$ forwardly of the axle of main gear wheel 44 that may be in the range of 2-10 times the diameter of main gear wheel 42. Deflector 126 may provide a smooth lead-in-surface extending forwardly of wheel 44 for engaging, and riding upon, water-like a ski, or hull or slipper or shoe. Wheel 44 extends partially downwardly proud of the profile of deflector plate. The extent to which it stands downwardly proud may correspond to the expected deflection of the tire of wheel 44 during a normal landing, plus an allowance of extra travel, perhaps 50% of nominal normal landing load travel. In the event that aircraft 20 should land on water with the main gear extended, wheel 44 can only partially immerse itself before the aftmost portion of deflector plate 126 also engages the water. At any significant speed, the clock-wise counter-acting lift arising from deflector plate 126 planing on the water may tend to counter-act the counter-clockwise pitching moment generated by hydrodynamic drag on the exposed protruding portion of wheel 44.

In an alternate, or additional, embodiment, main gear housing assembly 40 may include hydrofoil members, such as a first or outboard hydrofoil member 190 and a second or inboard hydrofoil member 192, and, should the deflectors not be considered sufficient, hydrofoils 190 and 192 may tend also to generate a clockwise lifting moment tending to counteract the overturning moment arising from hydrodynamic drag. Hydrofoils 190 and 192 may be relatively small, and may have the appearance of relatively short "fins" extending laterally of the sponson structures respectively. Aircraft 20 may have respective outboard and inboard reliefs or rebates, or seats or accommodations 191 and 193 corresponding to hydrofoils 190 and 192, such that in the retracted position of the landing gear, hydrofoils 190 and 192 are at least partially (in the case of hydrofoil member 190) or fully (in the case of hydrofoil member 192) concealed or seated in a position that is flush with the adjacent faired structure, giving a relatively smooth streamlined form. As above, in the extended position of the landing gear hydrofoils 190 and 192 are fully exposed. Hydrofoils 190 and 192 may be located generally abreast of wheel 44 and set at a level near the level of the axle of wheel 44, such that in the event that a gear-down landing is made on water, and hydrofoils 190 and 192 may engage the water and begin to provide a lifting force even while the depth of wheel 44 in the water is relatively shallow.

In the event of a flat tire, or in the event of a gear transmission failure in which not all of the gear move to the selected position (be it up or down), the presence of nose deflector 90 and main gear deflector plates 126 may be such as to tend to provide a back-up skid surface for landing on terrain.

Nose wheel 46 has two rotational degrees of freedom—namely rotation about its axle, and pivoting rotation about its predominantly vertical steering shaft. Motion of the nose gear between retracted and extended positions is restricted to a single degree of freedom along the constrained arc of the parallelogram in the x-z plane. Deflector 90 has a single degree of freedom of motion—namely translation in the arc in the x-z plane associated with motion of the nose gear assembly generally. The up-and-down orientation of the nose gear steering shaft remains constant in the x-z plane.

Similarly, the main gear four bar linkage is constrained to motion in an x-z plane, and the wheel itself, while rotatable in the normal manner about its own axis of rotation to permit wheeled operation, is restricted to the single degree of freedom of travel along the arc traced by the bushings of shoe 120 relative to pivot point 128.

The wheeled landing gear deflectors or shoes or slippers or protectors, however termed, shown and described herein are not to be confused with landing gear "spats". First, "spats" are aerodynamic fittings employed to reduce fixed landing gear drag that generally are not intended to, and typically do not, produce lift (aerodynamic or otherwise); the shoes described herein are hydrodynamic lift members. Second, true "spats" tend to be a feature of fixed landing gear rather than retractable landing gear. Third, "spats" are aerodynamic fairings of very light structure, as opposed to being structural members intended to take substantial dynamic loads such as landing loads. Fourth, spats tend to extend predominantly rearwardly of the axle of the wheel, with the form of a trailing edge of diminishing section to reduce rearward separation of airflow. The present hydrodynamic deflectors or slippers or shoes extend predominantly forwardly of the gear, as opposed to aftward.

As described above, the anti-flip, or flip discouraging aspect is passive. That is, it does not rely on pilot intervention, or on electronic sensing or control systems to prevent landing in the wrong configuration. Of course, aircraft 20 may have such warning systems. However, even if they fail, the deflector may tend to work to protect against an overturning moment.

The deflector moves with the landing gear, and the forward facing surface of the deflector also defines a portion of the exterior fairing of the aircraft in its normal operation in flight. That is, the deflector is not concealed behind other structure, or inside a nacelle in the retracted position, but rather forms a surface of the normal exterior of the aircraft. In the retracted position that surface may be flush with adjacent external surfaces to form a relatively smooth, streamlined form. The deflector protects its respective wheel in both the retracted and the extended position.

Also, as described, the wheel protrudes from the deflector, or shoe, structure in both the extended and the retracted position. In both positions the wheel is in its rolling orientation, i.e., the axle is horizontal and perpendicular to the line of forward motion of the aircraft. In both positions the shoe or deflector protects, or encloses, more than half of the wheel, with the sides of the shoe or deflector extending from the downward portion thereof upwardly and rearwardly or the axle. That is, the wheel is covered on both front and sides.

Various embodiments have been described in detail. Since changes in and or additions to the above-described examples may be made without departing from the nature, spirit or scope of the invention, the invention is not to be limited to those details.

I claim:

1. Landing gear for an amphibious aircraft, said landing gear comprising:
   a wheel for rolling contact with a landing surface, and a deflector;
   said deflector defining a water-riding shell extending predominantly forwardly of said wheel;
   said deflector being pivotally mounted to a fixed position member of the amphibious aircraft forwardly of said wheel;
   said deflector having an accommodation in which said wheel is mounted;
   said wheel extending partially downwardly proud of said deflector; and
   said wheel and said deflector being mounted to move together, with said wheel protruding partially downwardly proud of said deflector.

2. The landing gear of claim 1 wherein said wheel is movable between a retracted position and an extended position, and said water-riding shell is correspondingly movable in co-operation with said wheel.

3. The landing gear of claim 2 wherein, immediately forward of said wheel said deflector has a centerline slope forwardly and upwardly of said wheel of less than 30 degrees from horizontal when said wheel is in said extended position.

4. The landing gear of claim 2 wherein, in said retracted position, immediately forward of said wheel said deflector has a centerline slope forwardly of said wheel that is tangent to horizontal.

5. The landing gear of claim 2 wherein said deflector forms one leg of a four-bar linkage, and said wheel is carried in a seat defining at least one other leg of that four-bar linkage.

6. The landing gear of claim 1 wherein said wheel has a foremost exposed portion and at said foremost exposed portion of said wheel a tangent to said wheel, when seen in side view has an angle of less than 45 degrees of arc from horizontal.

7. The landing gear of claim 1 wherein said deflector has an opening formed therein, and said wheel protrudes through said opening.

8. The landing gear of claim 1 wherein said deflector has a first side portion, a second side portion, and a keel portion therebetween, said wheel being mounted between said first side portion and said second side portion and said deflector extends at least three diameters forward of said wheel.

9. The landing gear of claim 1 wherein said deflector has a sacrificial spine, and said sacrificial spine is exposed and foremost, whereby in a gear-up landing said sacrificial spine is closer to the ground than any other non-wheel structure.

10. An amphibious aircraft having a water-riding shell and a wheeled landing gear for landing on a landing field, said wheeled landing gear being operable between retracted and extended positions, said landing gear being mounted within, and extending partially downwardly proud of, movable landing gear housings that define water-engaging surfaces forwardly and laterally of said landing gear, said amphibious aircraft having a first fixed position member located forwardly of a first of said landing gear housings, said first landing gear housing being movable relative to said first fixed-position member, said first landing gear housing being pivotally mounted to said amphibious aircraft forwardly of a first wheel of said landing gear; said first fixed position member and said first landing gear housing forming a co-operating common fairing of said amphibious aircraft; and, when said landing gear is operated to move from said retracted position to said extended position, said first landing gear housing and said first wheel of said landing gear move together, with said first wheel of said landing gear extending partially downwardly proud thereof.

11. The amphibious aircraft of claim 10 wherein said landing gear is a tricycle landing gear.

12. The amphibious aircraft of claim 10 wherein said landing gear includes a plurality of wheels and one of said landing gear wheels is a steerable nose gear.

13. A landing gear housing for a landing gear of an amphibious aircraft, said landing gear housing comprising:
- a water-riding shell having a leading end and a trailing end;
- said water-riding shell having a leading portion, a first side portion extending upwardly, and rearwardly to one side of said leading portion, and a second side portion extending upwardly and rearwardly to an opposite side of said leading portion, said first and second side portions being opposed;
- said leading end of said water-riding shell having a first mounting fitting movably connecting said landing gear housing to fixed structure of the amphibious aircraft, said first mounting fitting accommodating motion of said landing gear between a retracted position and an extended position;
- said trailing end of said water riding shell having a second mounting fitting for a wheel of said landing gear between said first and second side portions, the wheel having an axis of rotation, said second mounting fitting orienting the axis of rotation of the wheel transversely to said water-riding shell;
- said first mounting fitting is a pivotal fitting having an axis of rotation constraining said shell to angular motion, the axis of rotation of the wheel being parallel to the axis of rotation of said pivotal fitting; and
- said water riding shell having an accommodation through which the wheel protrudes downwardly in both said retracted position and said extended position.

14. The landing gear housing of claim 13 wherein, as installed on the amphibious aircraft the landing gear housing defines one bar of a four bar linkage.

15. The landing gear housing of claim 13 wherein said shell has a keel extending along said leading portion thereof.

16. The landing gear housing of claim 13 wherein said shell has an external surface defining an external surface of the amphibious aircraft during both flight and water borne operation.

17. A combination of the landing gear housing of claim 13 and a co-operating fixed-position member of the amphibious aircraft wherein the fixed position member and the shell form a co-operating common fairing of the aircraft.

18. The combination of claim 17 wherein said shell has at least a first hydrofoil member mounted thereto, and said fixed position member has an accommodation defined therein in which at least a portion of said first hydrofoil seats when said landing gear is in the retracted position.

* * * * *